March 11, 1952     M. C. JONES     2,588,390
HIGH-FREQUENCY POWER MEASURING DEVICE
Filed March 30, 1948     2 SHEETS—SHEET 1

Inventor
MACK C. JONES
By R. Clay Lindsey
Attorney

March 11, 1952 M. C. JONES 2,588,390
HIGH-FREQUENCY POWER MEASURING DEVICE
Filed March 30, 1948 2 SHEETS—SHEET 2
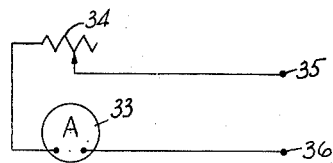
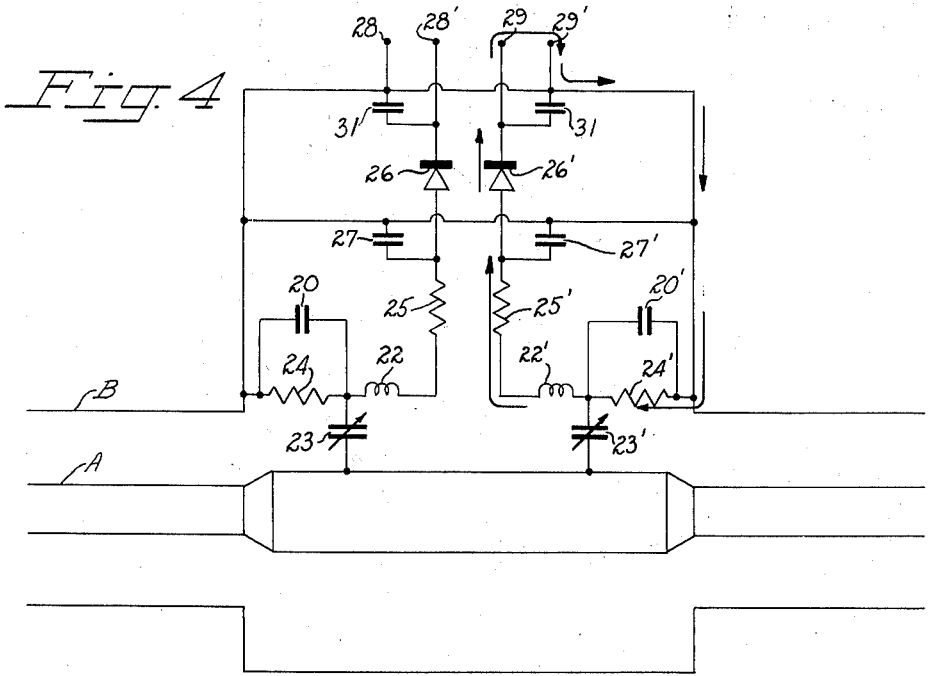
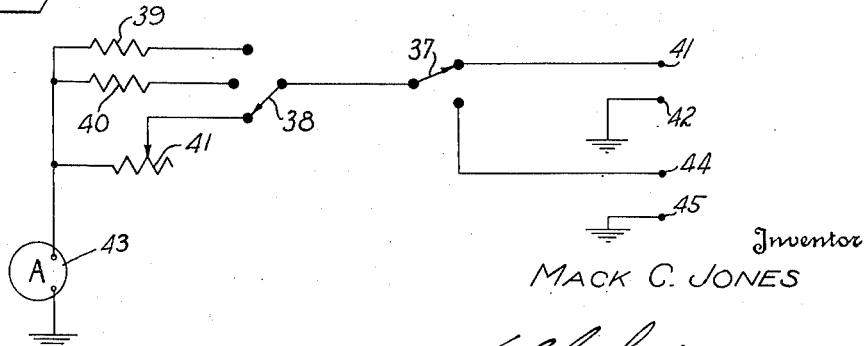
Inventor
MACK C. JONES
By
Attorney Patented Mar. 11, 1952

2,588,390

UNITED STATES PATENT OFFICE 2,588,390

HIGH-FREQUENCY POWER MEASURING DEVICE

Mack C. Jones, Unionville, Conn.

Application March 30, 1948, Serial No. 17,842

3 Claims. (Cl. 171—95)

The present invention relates to a device for use in connection with radio frequency transmission lines, particularly transmission lines such as the open wire and coaxial transmission lines commonly utilized, for example, in radio transmitting and associated circuits. The device is constructed and arranged to be responsive to incident and reflected voltages at any selected point in the line and is further constructed and arranged to measure the standing wave ratio and the net R. F. power traveling toward the load at that point.

The device of the present invention has particular utility in the radio field, being particularly useful to permit the operator of a radio station, for example, to monitor the output of his transmitter and the impedance of his antenna and to allow adjustment of antenna circuits to obtain optimum load conditions, this being particularly advantageous not only for initial adjustment but also to adapt the apparatus to changing conditions, for example, due to adverse weather, icing, etc.

It is an object of the invention to provide a device of the character referred to which is simple to use, which is accurate and foolproof in operation, and which is adaptable for use in a wide range of applications such as in line transmitting widely varying frequencies and power.

Another object of the invention is to provide such a device which will be effective for the intended purpose without causing any material power loss in the line.

Another object of the invention is to provide such a device which is economical in size and construction and in cost so that it may be installed in a small and compact space without interfering with the normal operation of the transmission line and so that it may be easily and readily manufactured from readily available parts at reasonable expense.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings—

Fig. 3 is a wiring diagram of a simplified meter circuit for use with the device of the invention;

Fig. 4 is a view similar to Figs. 1 and 2 of a third embodiment of the invention; and Fig. 5 is a wiring diagram of a preferred form of meter circuit for use in the device of the invention.

Figure 1:
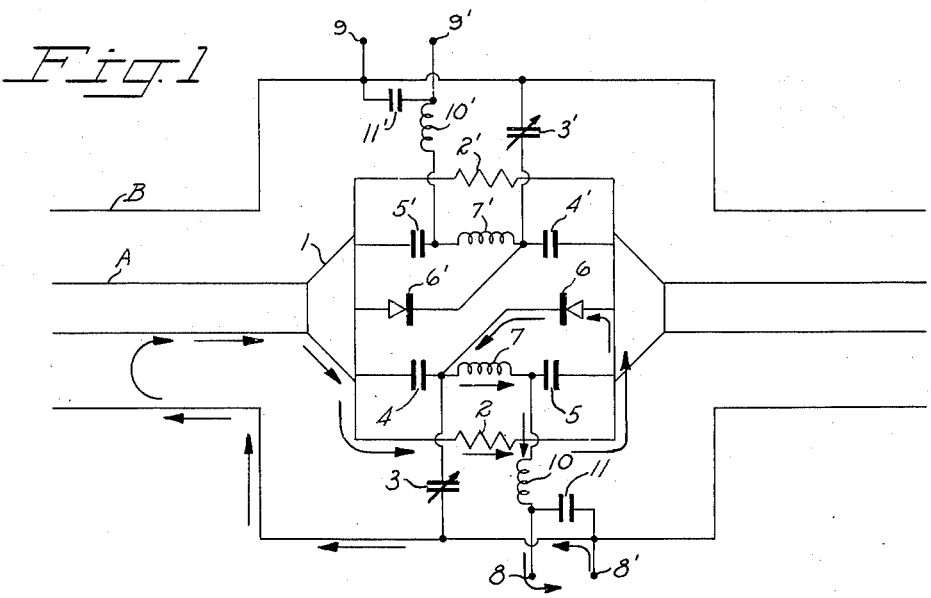
Figure 1 is a diagrammatic view of one embodiment of the invention shown as connected to a coaxial transmission line.

Referring first to the embodiment shown in Fig. 1 of the drawings, the device of the present invention is shown, by way of illustration, connected to a coaxial transmission line comprising an inner conductor A and a grounded outer tubular conductor B. As will be apparent, the invention could be applied equally well to other forms of transmission lines. The inner conductor A, in accordance with the invention, is flared outwardly to a larger diameter and separated at 1, the flare being provided to maintain continuity of the transmission line and to minimize reflection from the unit itself. In the embodiment shown in this figure as well as in Figs. 2 and 4, the left-hand side of the line (as viewed in the drawing) is assumed to be connected to the transmitter while the right-hand side of the line is connected to load. A resistance such as the resistor assembly comprising resistors 2 and 2' having a small resistance value compared with the characteristic impedance of the transmission line is utilized to bridge the separated inner conductor A at 1.

Connected between the outer conductor B and the opposite ends of inner conductor A are two voltage divider circuits, the first comprising variable capacitor 3 and fixed capacitor 4, and the other, variable capacitor 3' and fixed capacitor 4'. As will be apparent from the following description, a voltage divider circuit employing resistances of value corresponding to the reactance of capacitors 3 and 4 and 3' and 4' may be substituted for such capacitors, if desired, without departing from the scope of the invention. A rectifier 6 is connected in series with symmetrical resistor assembly 2, 2' and capacitor 4 while rectifier 6' is connected in series with resistor assembly 2, 2' and capacitor 4'. The network consisting of inductance 7, capacitor 5, inductance 10 and capacitor 11 and the network consisting of inductance 7', capacitor 5', inductance 10' and capacitor 11' are used to completely isolate the capacitor dividers 3, 4 and 3', 4', respectively, from extraneous effects caused by the voltage between the inner and outer conductors A and B. Assuming that the conductors A and B have a direct current coupling or path, for example, at the transmitter, which is conventional, the lead lines 8 and 8' carry a rectified current proportional to the rectified current of rectifiers 6, while lead lines 9 and 9' carry a rectified current proportional to the rectified current of rectifier 6'. The amount of these currents can readily be indicated by the meter circuit shown in Fig. 3 comprising ammeter 23 and potentiometer 34 connected in series to terminals 35 and 36. In effect, the potentiometer 34 converts the ammeter 23 into a voltmeter. When lead lines 8 and 8' are connected to terminals 35 and 36, the ammeter 23 indicates a rectified current (or voltage) which is in turn proportional to the R. F. voltage impressed on rectifier 6. Similarly, when lead lines 9 and 9' are connected to terminals 35 and 36, the ammeter reading is proportional to the R. F. voltage impressed on rectifier 6'.

The R. F. voltage impressed on rectifier 6 and hence the ammeter reading when the meter circuit of Fig. 3 is connected to leads 8 and 8' may be made directly proportional to the reflected voltage on the transmission line, and the R. F. voltage impressed on rectifier 6' and hence the ammeter reading when the meter circuit is connected to leads 9, 9' may be made directly proportional to the incident voltage on the transmission line. This follows from the following equations and adjustments:

The voltage drop across the symmetrical resistor assembly 2, 2' is directly proportional to the current in the center conductor A in accordance with the formula (1) $\qquad E_1 = IR_2$ where $E_1$ = voltage drop across resistor assembly 2, 2'
$I$ = current in center conductor A
$R_2$ = resistance of resistor assembly 2, 2'

The voltages appearing across capacitor 4 and 4', respectively, are proportional to the voltage appearing between the inner conductor A and the outer conductor B. For reasons set forth below, the variable capacitors 3 and 3' are adjusted in accordance with the invention to make the voltage across 4 and 4' equal to each other and proportional to the voltage between conductors A and B in the same ratio as the resistance of resistor assembly 2, 2' is proportional to the characteristic impedance of the transmission line (assumed to be a pure resistance). This is accomplished by satisfying the following formula (2) $\qquad E_2 = E\dfrac{C_3}{C_3+C_4} = E\dfrac{R_2}{R_0}$ $E_2$ = voltage drop across capacitor 4 or 4'
$C_3$ = capacitance of capacitor 3 or 3'
$C_4$ = capacitance of capacitor 4 or 4'
$R_2$ = capacitance of capacitor 4 or 4'
$R_0$ = characteristic impedance of the transmission line The two voltages $E_1$ and $E_2$ are combined and impressed on the rectifier 6 by reason of the connections described above whereby the reading of the meter circuit of Fig. 3 when connected to lead lines 8 and 8' is proportional to the combined voltages as given by the expression (3) $\qquad E_8 = E_2 - E_1$ where $E_8$ = voltage across rectifier 6.

However, by reason of the connections described above, the voltage impressed on rectifier 6' is the combination of voltage $E_2$ and voltage $E_1$ whereby the reading of the meter circuit when connected to leads 9 and 9' is proportional to the combined voltages as given by the expression (4) $\qquad E_9 = E_2 + E_1$ where $E_9$ = voltage across rectifier 6'.

By substitution of Formulae 1 and 2 in Formulae 3 and 4 respectively, the following relationship is derived:

(5) $\qquad E_8 = E\dfrac{R_2}{R_0} - IR_2$ and (6) $\qquad E_9 = E\dfrac{R_2}{R_0} + IR_2$ It is well known that the voltage on a transmission line can be considered as the sum of the incident and reflected voltages and the current can be considered as the difference between the incident and reflected currents. This relationship may be expressed as follows:

(7) $\qquad E_L = E_i + E_r$ and (8) $\qquad I_L = I_i - I_r$ where $E_L$ = line voltage
$E_r$ = reflected component of voltage
$E_i$ = incident component of voltage
$I_L$ = line current
$I_r$ = reflected component of current
$I_i$ = incident component of current Therefore, by substituting Formulae 7 and 8 in Formulae 5 and 6, the following relationship is established:

(9) $\qquad E_8 = (E_i + E_r)\dfrac{R_2}{R_0} - (I_i - I_r)R_2$

(10) $\qquad E_9 = (E_i + E_r)\dfrac{R_2}{R_0} + (I_i - I_r)R_2$

However, it is equally well known that the reflected voltage is equal to the reflected current times characteristic impedance and the incident voltage is equal to the incident current times characteristic impedance. Consequently, Formulae 9 and 10 may be rewritten as follows:

(11) $\qquad E_8 = \left(\dfrac{2R_2}{R_0}\right)E_r$

(12) $\qquad E_9 = \left(\dfrac{2R_2}{R_0}\right)E_i$

Inasmuch as $$\dfrac{R_2}{R_0}$$

is a constant, $E_8$ is proportional to reflected voltage in the transmission line and $E_9$ is proportional to incident voltage.

Figure 2:
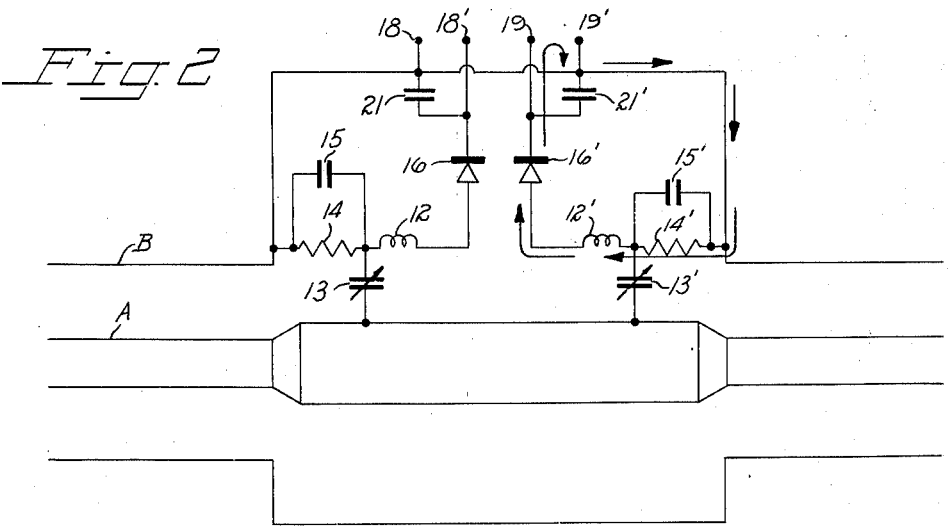
Fig. 2 is a similar view of a second embodiment of the invention.

If desired, a similar derivation of voltages proportional to reflected and incident voltages respectively may be obtained by use of the circuit shown in Fig. 2 of the drawings. Referring to Fig. 2, it will be seen that the voltage existing between the inner conductor A and the outer conductor B is divided in a pair of similar voltage divider circuits, the one comprising variable capacitor 13 and resistor 14 while the other comprises variable capacitor 13' and resistor 14'.

In this embodiment, the inner conductor A is not separated and a voltage proportional to the current flowing in the conductor A is obtained by mutual inductances 12 and 12'. In other words, the embodiment shown in Fig. 2 comprises both lumped and distributed constants unlike the embodiment shown in Fig. 1 which comprises lumped constants only. If desired, however, the inner inductor A may be separated as in the case of the embodiment shown in Fig. 1 and inductances may be placed in series therewith and the voltage produced across the same may be substituted for the voltage produced in the mutual inductances 12 and 12'.

The capacitors 15 and 15' are used to counteract stray fields in the unit which might cause an error in the readings. As is well known, the effect of one coupler on the other is to produce an induced voltage which it is preferred not to take into account when calibrating the device. Since this induced voltage is proportional to frequency, its effect can be cancelled by another equal and opposite effect which also is proportional to frequency by means of the small capacitors 15 and 15'.

The resistors 14 and 14' are connected in series with the mutual inductances 12 and 12' respectively and the current therein is rectified by rectifiers 16 and 16' respectively. The voltage derived at terminals 18 and 18', therefore, is proportional to the rectified current flowing through rectifier 16 while the voltage across terminals 19 and 19' is proportional to the rectified current of rectifier 16'. Capacitors 21 and 21' are utilized to isolate these circuits from extraneous effects caused by the voltage between the inner and outer conductors.

The voltage drop across the resistors 14 and 14' is obtained by current flowing through the capacitors 13 and 13' respectively. By utilizing capacitors having a high reactance compared with the resistance of the resistors 14 and 14', the voltage across these resistors may be taken to be substantially as follows:

$$(13) \quad E_{14} = E\frac{R_{14}}{X_c} = ER_2WC$$

where $E_{14}$ = voltage component across resistor 14 or 14'
$E$ = line voltage
$R_{14}$ = resistance of resistor 14 or 14'
$X_c$ = impedance of capacitor 13 or 13'
$W = 2\pi$ times frequency
$C$ = capacitance of capacitors 13 or 13'

The voltage produced across the mutual inductances 12 or 12' may be expressed as follows:

$$(14) \quad E_{12} = IWM$$

where $E_{12}$ = voltage across mutual inductances 12 or 12'
$I$ = line current
$W = 2\pi$ times frequency
$M$ = inductance 12 or 12'

These two voltages are then combined and rectified by the rectifiers 16 and 16'. As a result, the voltages appearing at the terminals 18 and 18' and terminals 19 and 19' may be given by the following expressions:

$$(15) \quad E_{18} = E_1 + E_2 = W(ER_2C + IM)$$

where $E_{18}$ = voltage at terminals 18, 18'.

$$(16) \quad E_{19} = E_1 - E_2 = W(ER_2C - IM)$$

where $E_{19}$ = voltage at terminals 19, 19'.

By suitable adjustment of the capacitors 13 and 13', the following relationship may be satisfied:

$$(17) \quad R_0R_2C = M$$

Rewriting the expressions for $E_{18}$ and $E_{19}$, we now have:

$$(18) \quad E_{18} = \frac{ZW}{R_2C}E_i = WBE_i$$

and $$(19) \quad E_{19} = \frac{ZW}{R_2C}E_r = WBE_r$$

where $B$ = a constant.

This will be seen to be similar to the equations for $E_8$ and $E_9$ obtained with the coupler circuit shown in Fig. 1 of the drawings as described above. There is, however, one important difference, namely, that the voltages obtained by the circuit shown in Fig. 2 are directly proportional to the frequency of measurement. This means that the circuit as shown is sensitive to frequency and its power scales must be calibrated for each individual frequency used. This is not true, however, when the standing wave ratio is measured inasmuch as this includes a calibration procedure as described hereinafter.

By modifying the circuit shown in Fig. 2 to obtain the circuit shown in Fig. 4 of the drawings, this dependency on frequency may be eliminated and the instrument may be calibrated exactly as the instrument shown in Fig. 1. In the circuit shown in Fig. 4, the variable capacitors 23 and 23' correspond to the variable capacitors 13 and 13'; resistors 24 and 24' correspond to the resistors 14 and 14'; mutual inductances 22 and 22' correspond to mutual inductances 12 and 12'; rectifiers 26 and 26' correspond to rectifiers 16 and 16', and capacitors 31 and 31' correspond to capacitors 21 and 21'. In the circuit shown in Fig. 4, the essential modification comprises the addition of capacitance by means of the capacitors 27 and 27'. These constants are selected so that the reactance of the capacitors is small compared with the value of resistance. Resistors 25 and 25' are added, if necessary, to supplement resistors 24 and 24'. As a result, the voltages at terminals 28 and 28' and 29 and 29' (Formulae 18 and 19) are then modified as follows:

$$(20) \quad E_{28} = \frac{X_c}{R}WBE_i = \frac{1}{WCR}WBE_i = DE_i$$

$$(21) \quad E_{29} = \frac{X_c}{R}WBE_r = \frac{1}{WCR}WBE_r = DE_r$$

where $E_{28}$ = voltage across lines 28, 28'
$E_{29}$ = voltage across lines 29, 29'
$D$ = a constant
$X_c$ = impedance of capacitor 27 or 27'
$R$ = resistance of resistor 25 or 25'

These expressions for $E_{28}$ and $E_{29}$ are now identical with those from the circuit shown in Fig. 1 except for the constant. The constant, of course, may be taken care of by suitable calibration.

For simplicity of presentation, the embodiments shown in Figs. 1, 2 and 4 comprise symmetrical circuits, one for deriving a voltage component proportional to incident voltage and the other for deriving a voltage component proportional to reflected voltage. Inasmuch as these circuits are identical except as to the way they are connected to the line it will be obvious that a single circuit may be used for both purposes merely by providing suitable switching means for connecting it to the circuits denoted by unprimed reference numerals or to the circuits denoted by primed reference numerals, as desired.

As previously mentioned, the meter circuit of Fig. 3 which, in essence, is a volt meter, is utilized for direct measurement of voltage values which are proportional to reflected and incident voltage respectively. However, in accordance with the invention, it is desired to provide means for utilizing such measurement to show the standing wave ratio and/or net power traveling down the line. This is accomplished in accordance with the invention by the meter circuit shown in Fig. 5 of the drawings. Referring to Fig. 5, the circuit comprises an ammeter 43 which is grounded at one end and connected at the other end to a plurality of resistors 39, 40 and 41, the latter resistor being a variable resistor or potentiometer. A multiple contact switch 38 is provided to make connections selectively with any one of these resistors individually. Switch 38 is connected to switch 37 which permits contact with either terminal 41 or 44. Terminal 41 is adapted to be connected to one of the leads 8, 8'; 18, 18'; or 28, 28' depending on which of the previous circuits is utilized. Terminal 44 is adapted to be connected to leads 9, 9'; 19, 19' or 29, 29' in a similar manner. Terminals 42 and 45 are grounded so as to be connected to the opposite side of ammeter 43.

By manipulation of the switch 37, the meter can be connected to either the incident or reflected voltage measuring circuits, as desired. To read standing wave ratio, the switch 38 is put in the position shown in the drawings, i. e., connected with variable resistor 41, and switch 37 is set to connect the switch 38 with terminal 44. The meter 43 is then set to just full scale by adjusting the variable resistor 41. This is equivalent to taking the incident voltage as unity for reference. The switch 37 is then shifted to connect the circuit to terminal 41 and the meter 43 now reads the reflected voltage as a percent of the incident voltage. This last reading, therefore, gives the ratio between $E_8$ (or $E_{18}$ or $E_{28}$) and $E_9$ (or $E_{19}$ or $E_{29}$) or the ratio between the reflected and incident voltages. This is equal to the reflection coefficient (K) of the load reflected to the point in the transmission line where the measurement is being made.

It is well known that the standing wave ratio is related to the reflection coefficient (K) by the following formula:

$$(22) \quad SWR = \frac{1-K}{1+K}$$

Since the meter scale reads directly the reflection coefficient, it may be calibrated in accordance with the above expression so that the standing wave ratio may be read directly from the scale. The power standing wave ratio is, of course, the square of the voltage standing ratio.

To obtain power readings, the following procedure is followed: The switch 38 is connected to an appropriate value of resistance, i. e., either the resistor 39 or 40, so that the meter is on scale. The switch 37 is then connected either to the incident or reflected voltage circuits. The values of resistors 39 and 40 are selected so that the meter reading may be interpreted in terms of actual transmission line voltage. With the meter 43 in position to read the reflected voltage, the reflected power can then be obtained from the following formula:

$$(23) \quad W_r = \frac{E_r^2}{R_0} = E_x^2 \left(\frac{R_0}{4R_2^2}\right)$$

where $W_r$ = reflected power
$E_r$ = reflected voltage
$E_x$ = voltage of lines 8, 8'; 18, 18'; or 28, 28'

Similarly, with the meter 43 connected to terminals 44 and 45 so that it reads the incident voltage, the incident power can be obtained from the formula:

$$(24) \quad W_i = \frac{E_2^2}{R_0} = E_y^2 \left(\frac{R_0}{4R_2^2}\right)$$

where $W_i$ = incident power
$E_2$ = line voltage
$E_y$ = voltage of lines 9, 9'; 19, 19'; or 29, 29'.

However, inasmuch as the ratio of $R_0$ to $4R_2^2$ is a constant, the foregoing Formulae 23 and 24 may be rewritten as follows:

$$(25) \quad W_r = AE_x^2$$
$$(26) \quad W_i = AE_y^2$$

where $$A = \text{a constant} = \frac{R_0}{4R_2^2}$$

It thus may be seen that both reflected and incident power may be read on the same meter scale simply by connecting switch 37 either to terminal 41 or 44. The meter scale may be calibrated in accordance with the above formula and the power values may be read directly from the meter scale. The net power traveling toward the load at that point in the transmission line is, of course, the difference between the incident and the reflected power as given in the following equation:

$$(27) \quad \text{net power} = W_i - W_r$$

It thus will be seen that there has been provided, in accordance with the invention, a measuring device having great usefulness, particularly in the radio transmission field, which device is simple and efficient in operation and which greatly facilitates the proper adjustment of the load.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a device for measuring standing wave ratio and power in a two-conductor frequency transmission line comprising a mutual inductance for developing a first voltage component proportional to line current and frequency, a voltage divider for developing a second voltage component proportional to line voltage and frequency comprising a capacitor and a resistor whose values are such that the product of the capacitance and resistance of said capacitor and resistor, respectively, and the characteristic impedance of the line is equal to said mutual inductance, means for connecting the voltage divider across the two conductors, a circuit comprising said mutual inductance and said resistor in series and having an output voltage equal to the sum of said voltage components which varies directly with frequency, and a load on the said circuit comprising a capacitor of relatively low reactance compared with the resistance of said resistor, whereby said output voltage is rendered independent of frequency.

2. In a device for measuring standing wave ratio and power in a two-conductor frequency transmission line comprising a mutual inductance for developing a first voltage component proportional to line current and frequency, a voltage divider for developing a second voltage component proportional to line voltage and frequency comprising a capacitor and a resistor whose values are such that the product of the capacitance and resistance of said capacitor and resistor, respectively, and the characteristic impedance of the line is equal to said mutual inductance, means for connecting the voltage divider across the two conductors, a circuit comprising said mutual inductance and said resistor in series and having an output voltage equal to the sum of said voltage components which varies directly with frequency, and a load on the said circuit comprising a voltage divider having an output voltage to input voltage ratio reversely proportional to frequency, whereby a resulting voltage is produced independent of frequency.

3. In a device for measuring standing wave ratio and power in a two-conductor frequency transmission line comprising a resistor for developing a first voltage component proportional to line current and independent of frequency, a voltage divider comprising a pair of capacitors whose reactances are such that the ratio of the capacitors is equal to the ratio of the resistor to the characteristic impedance of the transmission line, means for connecting the voltage divider across the two conductors to develop a voltage component proportional to line voltage and independent of frequency, and means for combining said two voltage components.

MACK C. JONES.

REFERENCES CITED

The following references are of record in the file of this patent:

UNITED STATES PATENTS

| Number | Name | Date |
| --- | --- | --- |
| 1,586,533 | Peterson | June 1, 1926 |
| 2,278,687 | Brown | Apr. 7, 1942 |
| 2,297,255 | Schulze-Herringen et al. | Sept. 29, 1942 |

OTHER REFERENCES

Article, "A Method of Determining and Monitoring Power and Impedance at High Frequencies," by Morrison and Younker, presented 1947 I. R. E. Convention, New York, New York, pages 1 through 5. Copy in Division 65, U. S Patent Office.